United States Patent
Kim et al.

(10) Patent No.: US 9,844,092 B2
(45) Date of Patent: Dec. 12, 2017

(54) OPERATION METHOD OF COORDINATOR AND NODE SUPPORTING BLOCK ACK SCHEME AND LINK ADAPTATION FOR MULTI-RATE TRANSMISSION

(71) Applicant: Samsung Electronics Co., Ltd., Suwon-si (KR)

(72) Inventors: Tae Seok Kim, Hwaseong-si (KR); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 14/887,703

(22) Filed: Oct. 20, 2015

(65) Prior Publication Data

US 2016/0119968 A1 Apr. 28, 2016

(30) Foreign Application Priority Data

Oct. 22, 2014 (KR) ........................ 10-2014-0143529

(51) Int. Cl.
| | |
|---|---|
| *H04H 20/71* | (2008.01) |
| *H04W 76/04* | (2009.01) |
| *H04W 4/00* | (2009.01) |
| *H04W 76/00* | (2009.01) |
| *H04W 48/00* | (2009.01) |
| *H04L 1/16* | (2006.01) |

(52) U.S. Cl.
CPC ........... *H04W 76/04* (2013.01); *H04L 1/1614* (2013.01); *H04L 1/1621* (2013.01); *H04L 1/1664* (2013.01); *H04L 1/1671* (2013.01); *H04W 4/008* (2013.01); *H04W 48/00* (2013.01); *H04W 76/002* (2013.01)

(58) Field of Classification Search
CPC ..... H04W 76/04; H04W 48/00; H04W 4/008; H04W 76/002; H04L 1/1671; H04L 1/1614; H04L 1/1621; H04L 1/1664
See application file for complete search history.

(56) References Cited

U.S. PATENT DOCUMENTS

| | | | |
|---|---|---|---|
| 7,825,793 B1 | 11/2010 | Spillman et al. | |
| 2004/0121730 A1* | 6/2004 | Kadous | ............... H04B 7/0417 455/13.3 |
| 2005/0086366 A1 | 4/2005 | Luebke et al. | |
| 2006/0034317 A1* | 2/2006 | Hong | .................... H04L 1/1614 370/445 |
| 2006/0182076 A1 | 8/2006 | Wang | |
| 2006/0291483 A1 | 12/2006 | Sela | |
| 2007/0173285 A1 | 7/2007 | Hedstrom | |
| 2007/0258508 A1 | 11/2007 | Werb et al. | |
| 2007/0260905 A1 | 11/2007 | Marsden et al. | |
| 2008/0025330 A1 | 1/2008 | Wang | |

(Continued)

FOREIGN PATENT DOCUMENTS

| | | |
|---|---|---|
| KR | 10-2006-0046202 A | 5/2006 |
| KR | 10-2007-0087725 A | 8/2007 |
| KR | 10-2012-0139945 A | 12/2012 |

*Primary Examiner* — Afshawn Towfighi
(74) *Attorney, Agent, or Firm* — NSIP Law

(57) ABSTRACT

Provided is an operation method of a coordinator, the method including receiving a data packet from a node, configuring bitmap information indicating whether the data packet is received, and broadcasting a beacon packet including the bitmap information indicating whether the data packet is received.

19 Claims, 11 Drawing Sheets

(56) References Cited

U.S. PATENT DOCUMENTS

| | | |
|---|---|---|
| 2008/0041261 A1 | 2/2008 | Hummel et al. |
| 2008/0080460 A1 | 4/2008 | Ramkumar et al. |
| 2008/0253328 A1* | 10/2008 | Sahinoglu ............ H04W 74/02 |
| | | 370/330 |
| 2008/0258907 A1 | 10/2008 | Kalpaxis |
| 2010/0045597 A1 | 2/2010 | Popineau |
| 2010/0176933 A1 | 7/2010 | Barragan Trevino et al. |
| 2010/0309003 A1 | 12/2010 | Rousseau |
| 2011/0167024 A1 | 7/2011 | Maldonado Diaz et al. |
| 2011/0310770 A1 | 12/2011 | Liang et al. |
| 2012/0063427 A1 | 3/2012 | Kandekar et al. |
| 2012/0176247 A1 | 7/2012 | Feldstein et al. |
| 2013/0235781 A1* | 9/2013 | Dangui ................ H04L 1/1614 |
| | | 370/312 |
| 2014/0070003 A1 | 3/2014 | Radicella |
| 2014/0179367 A1 | 6/2014 | Hedstrom |

\* cited by examiner

900

1000

OPERATION METHOD OF COORDINATOR AND NODE SUPPORTING BLOCK ACK SCHEME AND LINK ADAPTATION FOR MULTI-RATE TRANSMISSION

CROSS-REFERENCE TO RELATED APPLICATION(S)

This application claims the benefit under 35 USC 119(a) of Korean Patent Application No. 10-2014-0143529, filed on Oct. 22, 2014, in the Korean Intellectual Property Office, the entire disclosure of which is incorporated herein by reference for all purposes.

BACKGROUND

1. Field

The following description relates to an operation method of a coordinator and a node to support a block acknowledgement (ACK) scheme and a link adaptation for a multi-rate transmission.

2. Description of Related Art

With the development of applications that perform a variety of functions, connections between sensor devices and portable digital devices such as a smartphone are to increase. Also, the appearance of various sensor devices requires a support for a variety of data transmission ranging from an application to transmit a small amount of data, such as a temperature sensor, to an application to transmit a large amount of data such as an electrocardiogram (ECG) sensor or an accelerometer sensor. Here, a small amount of data may be a few bytes of data having intermittent intervals corresponding to a few seconds to a few minutes and a large amount of data may be hundreds of bytes of data having a short interval corresponding to a few ms.

An Institute of Electrical and Electronics Engineers (IEEE) 802.15.4 technology relates to a wireless technology developed to support communication between sensor nodes and is developed mainly for an application that receives intermittently occurring data. Accordingly, the IEEE 802.15.4 technology is not optimized to support communication using a relatively high data rate and cannot support a multi-rate capability function of supporting various rates.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a system including an operation method of a coordinator, the method including receiving a data packet from a node, configuring bitmap information indicating whether the data packet is received, and broadcasting a beacon packet including the bitmap information indicating whether the data packet is received.

The configuring of the bitmap information may include configuring, the node, the bitmap information indicating whether the data packet is received in a guaranteed time slot (GTS) section.

The broadcasting of the beacon packet may include broadcasting the beacon packet by including the bitmap information configured for the node in a beacon payload of the beacon packet.

The beacon payload of the beacon packet may include at least one of a number of bitmap information, an address of the node, a bitmap of the node, and a transmission format indication (TFI) of the node.

The TFI of the node may be used for the coordinator to control a link adaptation.

The operation method of the coordinator may further include determining data modulation information including a modulation method and a modulation rate of the data packet.

The determining of the data modulation information may include determining the data modulation information based on channel state information of the data packet.

The operation method of the coordinator may further include setting a TFT value of the node included in a beacon payload of the beacon packet based on the determined data modulation information.

The operation method of the coordinator may further include calculating a number of GTSs allocated to the node based on the determined data modulation information.

The operation method of the coordinator may further include changing a GTS length based on the determined data modulation information.

The broadcasting of the beacon packet may include broadcasting, to the node, the beacon packet including a GTS field including the changed GTS length and a GTS starting slot.

The operation method of the coordinator may further include receiving the data packet including a block acknowledgement (ACK) information field including a GTS change determined by the node and a changed GTS length.

The operation method of the coordinator may further include adjusting values of a GTS field based on information of the block ACK information field included in the data packet, and broadcasting the adjusted values of the GTS field through a next beacon packet.

In another general aspect, there is provided an operation method of a node, the method including configuring a media access control (MAC) payload including a block ACK information field, the block ACK information field including a block ACK and data modulation information, and transmitting a data packet including the MAC payload to a coordinator.

The block ACK information field may include at least one of a block ACK sequence number, a GTS change in association with a data modulation, and a GTS length.

The operation method of the node may further include determining the data modulation information based on channel state information of a beacon packet received from the coordinator or bitmap information included in the beacon packet.

The operation method of the node may further include setting a GTS change included in the block ACK information field of the data packet based on the determined data modulation information.

The operation method of the node may further include changing a GTS length according to the GTS change.

The operation method of the node may further include transmitting, to the coordinator, the data packet including the GTS change and the changed GTS length.

In another general aspect, there is provided a data packet receiving device including a communicator configured to receive the data packet and a processor configured to process bitmap information indicating whether the data packet is received and to broadcast a beacon packet including the bitmap information indicating whether the data packet is received.

In another general aspect, there is provided a data packet transmitting device including a processor configured to process a media access control (MAC) payload including a block acknowledgment (ACK) information field including data modulation information and a communicator configured to transmit a data packet including the MAC payload.

Other features and aspects will be apparent from the following detailed description, the drawings, and the claims.

Figure 1:
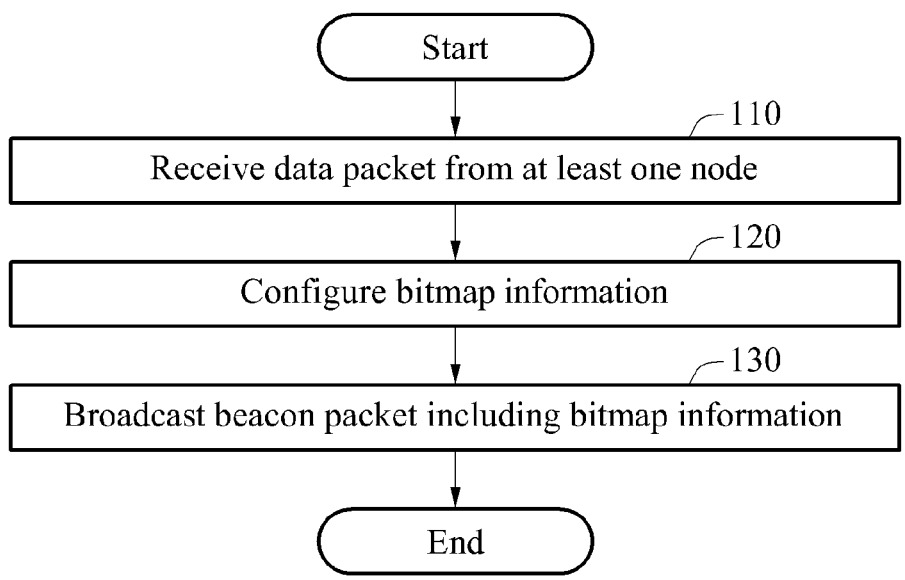
FIG. 1 is a flowchart illustrating an example of an operation method of a coordinator.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. For example, the progression of processing steps and/or operations described herein are merely examples, and the sequence of and/or operations are not limited to those set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples will be described with reference to the accompanying drawings. Like reference numerals refer to like elements throughout.

Various changes and modifications may be made to the examples. The examples described herein are not limited so that set forth herein and should be understood to include all the changes, modifications, and equivalents thereof.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Also, when describing embodiments with reference to the accompanying drawings, like reference numerals are assigned to like elements throughout and a repeated description related to is omitted here. When it is determined a detailed description related to a known function or configuration they may make the purpose of the embodiments unnecessarily ambiguous, the detailed description will be omitted here.

FIG. 1 illustrates an example of an operation method of a coordinator.

Referring to FIG. 1, in operation 110, the coordinator receives a data packet(s) from at least one node in an allocated guaranteed time slot (GTS) section. Here, a node may be one or more sensor nodes. A format of the data packet received by the coordinator is described with reference to FIG. 3.

The coordinator supports a GTS function and allocates GTS to nodes that request the GTS.

In operation 120, the coordinator configures bitmap information indicating whether the data packet(s) is received. In operation 120, the coordinator configures, for each node, bitmap information indicating whether the data packet is accurately received without having an error.

The coordinator creates a bitmap to inform a node having transmitted the data packet about a reception of the data packet. A method of creating, by the coordinator, a bitmap may be classified as follows, based on, for example, a sequence number use method of a node.

The coordinator receives a data packet and creates a bitmap based on information of a block acknowledgement (ACK) sequence number field (see 321 of FIG. 3) verified from a media access control (MAC) payload (see 310 of FIG. 3) of the data packet. The coordinator sets, to "1", a bit of the bitmap corresponding to information of the block ACK sequence number field. Here, the coordinator may set, to "0", a bit of a bitmap corresponding to a not-received data packet.

The coordinator receives a data packet and creates a bitmap based on information of a data sequence number field (see 340 of FIG. 3) included in a MAC header (see 330 of FIG. 3) of the data packet.

The coordinator divides information of the data sequence number field of the received data packet by a bitmap size for each node, and sets, to "1", a bit of a bitmap corresponding to a remainder. Here, the bitmap size may be, for example, a bit unit. A bit of a bitmap corresponding to a not-received data packet may be set to "0".

In operation 130, the coordinator broadcasts a beacon packet including the bitmap information. In operation 130, the coordinator broadcasts the beacon packet by including the bitmap information configured for each node in a beacon payload of the beacon packet.

The coordinator may periodically broadcast a beacon packet for communication, for example, within a personal area network (PAN). A format of the beacon packet broadcasted by the coordinator in operation 130 is described with reference to FIG. 4.

In an example, overhead according to a packet transmission may be removed by back-to-back transmitting a packet without transmitting and receiving an ACK for each transmission packet and by transmitting an ACK through a block ACK using a beacon payload of a beacon packet.

Figure 2:
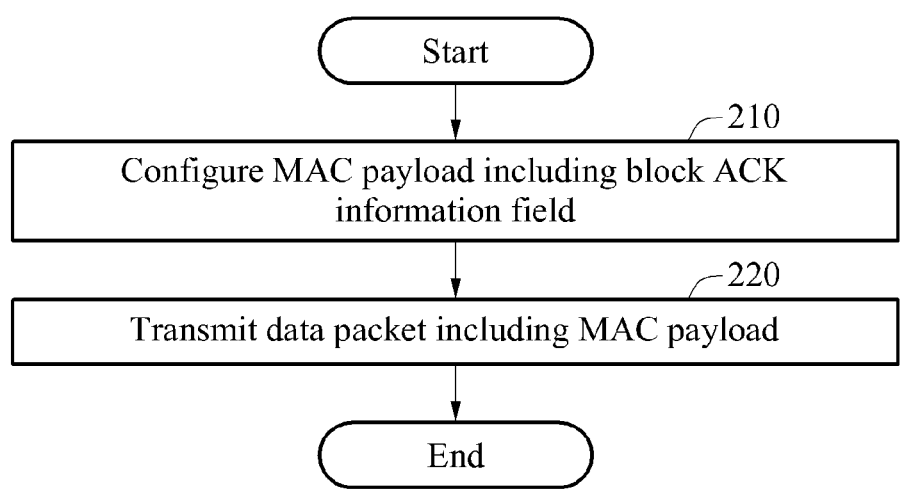
FIG. 2 is a flowchart illustrating an example of an operation method of a node.

FIG. 2 illustrates an example of an operation method of a node.

Referring to FIG. 2, in operation 210, the node configures a MAC payload including a block ACK information field. Here, block ACK information includes a block ACK and data modulation information. The data modulation information may include, for example, a data modulation method, a modulation rate, a GTS change according to a modulation method, and a changed GTS length, but is not limited thereto.

In operation 220, the node transmits a data packet including the configured MAC payload to the coordinator.

The node transmits a data packet without requesting an ACK, in a GTS section allocated by the coordinator. The node may use the following methods to verify whether the coordinator receives the transmitted data packet, but it is noted that the methods are not limited thereto.

In operation 210, the node records a block ACK sequence number in a block ACK sequence number field (see 321 of FIG. 3) included in a block ACK information field (see 320 of FIG. 3) of a MAC payload of the data packet. The node allocates a block ACK sequence number, starting from "0" based on a transmission order within the GTS section.

In an example, in operation 210, the node may record a block ACK sequence number using a data sequence number field included in a MAC header of the data packet.

For example, the node requests the coordinator to allocate a GTS based on a quality of service (QoS) of an application to support a throughput.

Figure 3:
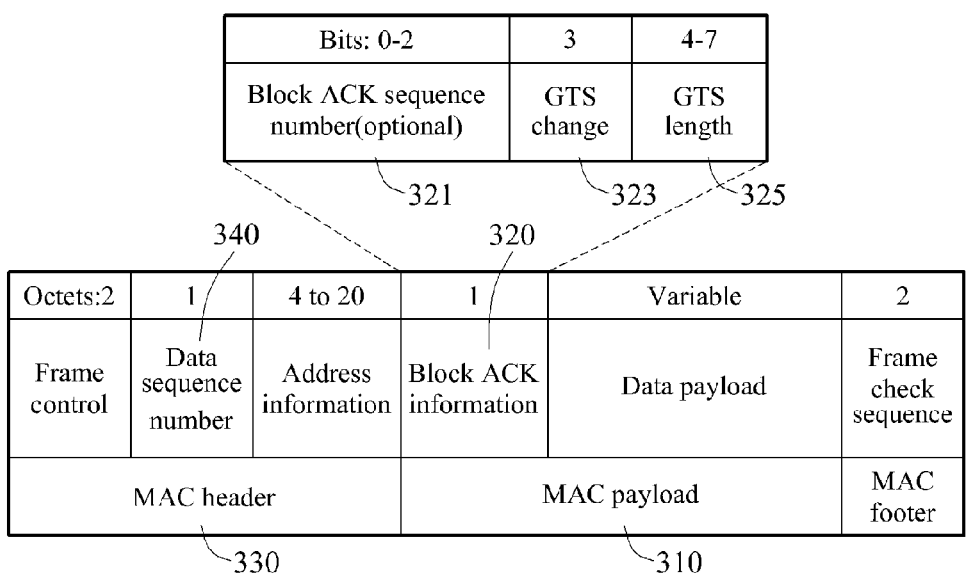
FIG. 3 is a diagram illustrating an example of a format of a data packet transmitted from a node.

FIG. 3 illustrates an example of a format of a data packet transmitted from a node.

Referring to FIG. 3 a format of a data packet 300 capable of supporting a block ACK and a link adaptation is illustrated.

The data packet 300 includes, for example, a MAC payload 310, a MAC header 330, and a MAC footer.

The MAC payload 310 includes, for example, a block ACK information field 320 and a data payload field.

The block ACK information field 320 includes, for example, a block ACK sequence number field 321, a GTS change field 323, and a GTS length field 325.

The block ACK sequence number field 321 stores a new sequence number defined for a block ACK. Here, the stored new sequence number is distinguished from a sequence number stored in a data sequence number field 340 of the MAC header 330.

The GTS change field 323 refers to a field that indicates whether a slot length of a GTS is changed, and is set to have a value of "1" when the slot length of the GTS is changed and is set to have a value of "0" when the slot length of the GTS is not changed.

The GTS length field 325 includes, for example, a GTS length required by the node.

Figure 4:
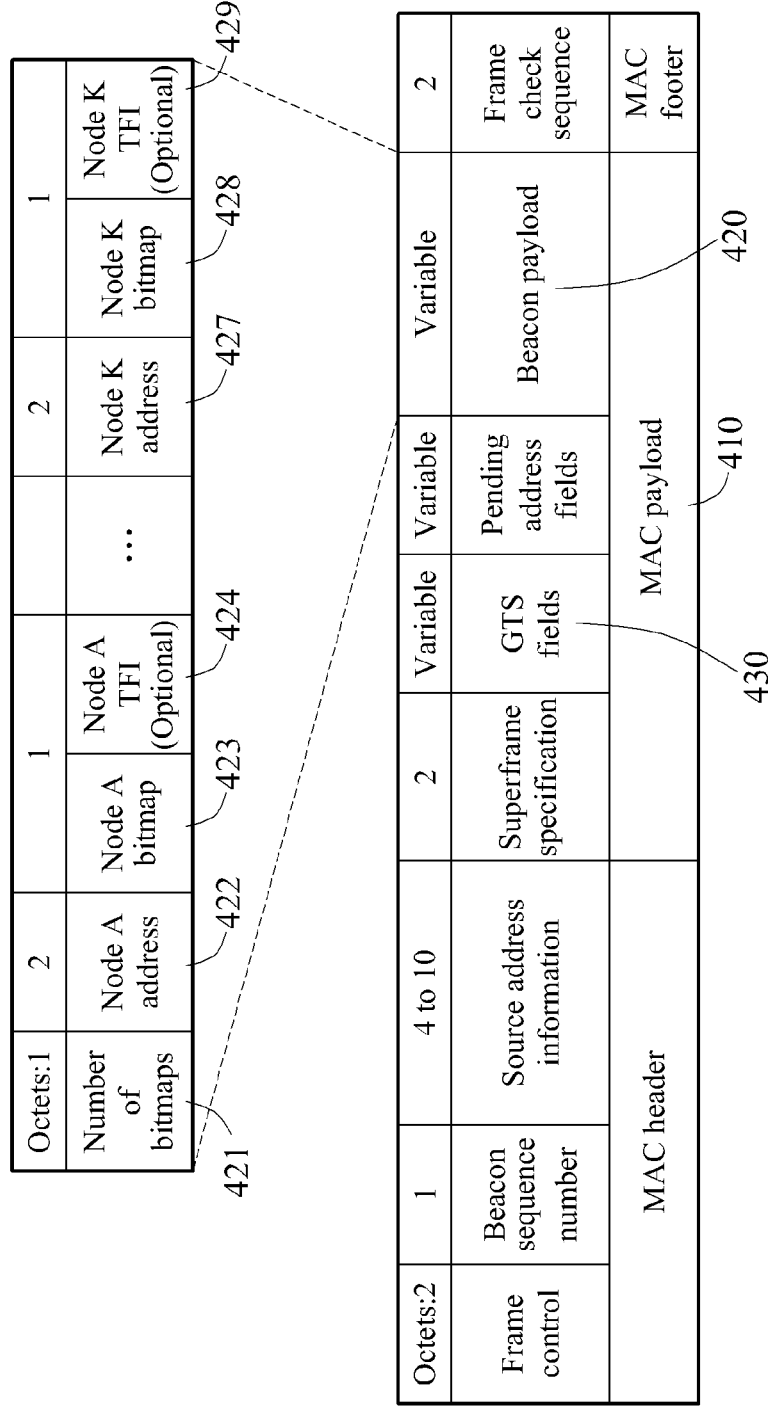
FIG. 4 is a diagram illustrating an example of a format of a beacon packet transmitted from a coordinator.

FIG. 4 illustrates an example of a format of a beacon packet transmitted from a coordinator.

Referring to FIG. 4, a format of an 802.15.4 type beacon packet 400 capable of supporting a block ACK and a link adaptation is illustrated.

The beacon packet 400 includes a beacon payload 420 and GTS fields 430 in a MAC payload 410.

The beacon payload 420 includes, for example, at least one of a number of bitmaps field 421, node address fields 422 and 427 of nodes, node bitmap fields 423 and 428 of the nodes, and transmission format indication (TFI) fields 424 and 429 of the nodes.

The number of bitmaps field 421 includes, for example, the number of nodes using a block ACK. The node verifies a length of the beacon payload 420 based on the number of nodes included in the number of bitmaps fields 421.

Each of the node address fields 422 and 427 includes a short address of a node allocated by the coordinator.

Each of the node bitmap fields 423 and 428 includes bitmap information created by the coordinator with respect to a data packet transmitted in a previous superframe.

Each of the TFI fields 424 and 429 stores an index of a modulation method to be used by a node and the modulation method set to each of the TFI fields 424 and 429 may be applied from a superframe in which the beacon packet is received.

The TFI fields 424 and 426 may be used for the coordinator to control a link adaptation.

In an example, the coordinator and the node may control a link adaptation by dynamically adjusting data modulation information, such as a change of a GTS length according to a change of a data modulation method and a changed GTS length, based on a channel state.

Hereinafter, an example of a coordinator to control a link adaptation is described with reference to FIGS. 5 and 7 and an example of a node to control a link adaptation is described with reference to FIGS. 6 and 8.

Figure 5:
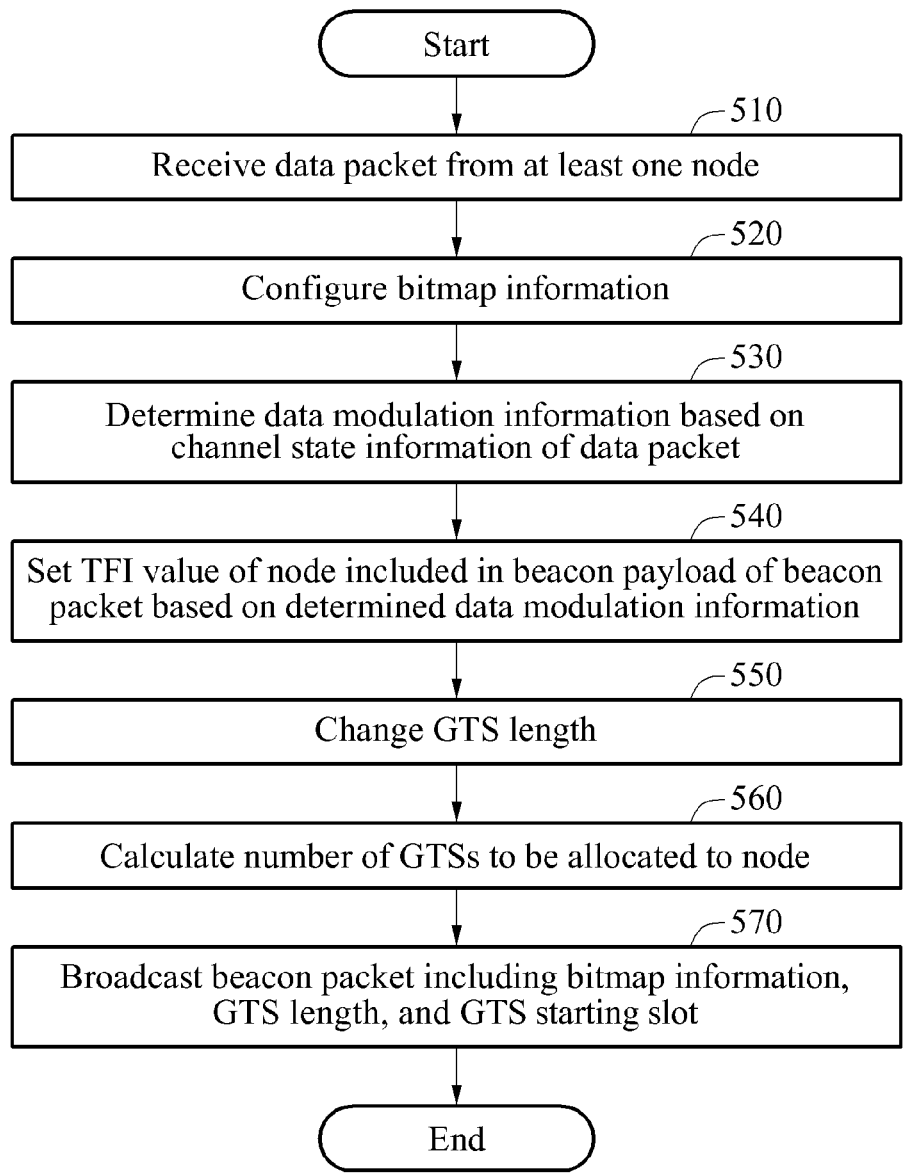
FIG. 5 is a flowchart illustrating an example of an operation method of a coordinator in response to the coordinator controlling a link adaptation.

FIG. 5 illustrates an example of an operation method of a coordinator in response to the coordinator controlling a link adaptation.

The coordinator determines data modulation information associated with a data modulation of a node and transfers the determined data modulation information to nodes.

Referring to FIG. 5, the coordinator receives a data packet from at least one node in operation 510 and configures bitmap information indicating whether the data packet is received in operation 520.

In operation 530, the coordinator determines data modulation information including a modulation method and a modulation rate of the data packet. In operation 530, the coordinator determines data modulation information based on channel state information of the data packet. The determined data modulation information may be created for each node and included in a beacon payload together with the bitmap information.

The channel state information of the data packet includes various indices, for example, a received signal strength indicator (RSSI) received through a physical (PHY) layer and a packet error rate (PER) received through a MAC layer.

In operation 540, the coordinator sets a TFI value of a node included in a beacon payload of a beacon packet based on the determined data modulation information. The TFI value of the node may be set to be a value from "2" to "4" based on the determined data modulation information, for example, a modulation method and a modulation rate, but is not limited thereto. That is, the TFI values can be set to other values.

In operation 550, the coordinator changes, for example, adjusts a GTS length based on the determined data modulation information. Also, the coordinator may change the GTS length according to the data modulation information determined in operation 530 to enhance a slot usage and to provide a QoS. The changed GTS length may be transferred to the node through the GTS fields 430 included in the MAC payload 410 of the beacon packet 400.

In operation 560, the coordinator calculates the number of GTSs to be allocated to the node based on the determined data modulation information. The coordinator also calculates a GTS starting slot based on the changed GTS length and the calculated number of GTSs.

In operation 570, the coordinator broadcasts, to the node, the beacon packet including the configured bitmap information and a GTS field that includes the GTS length and the GTS starting slot. Although described that the beacon packet includes the configured bitmap information and the GTS field, it is noted that the beacon packet is not limited thereto and thus may include more or less information and fields.

In addition, when the node controls a link adaptation, the coordinator may receive, from the node, the data packet including block ACK information field that includes a GTS change determined by the node and a changed GTS length. The coordinator adjusts GTS field values based on information of the block ACK information field included in the data packet, and broadcasts the adjusted GTS field values to the node through a next beacon packet.

Figure 6:
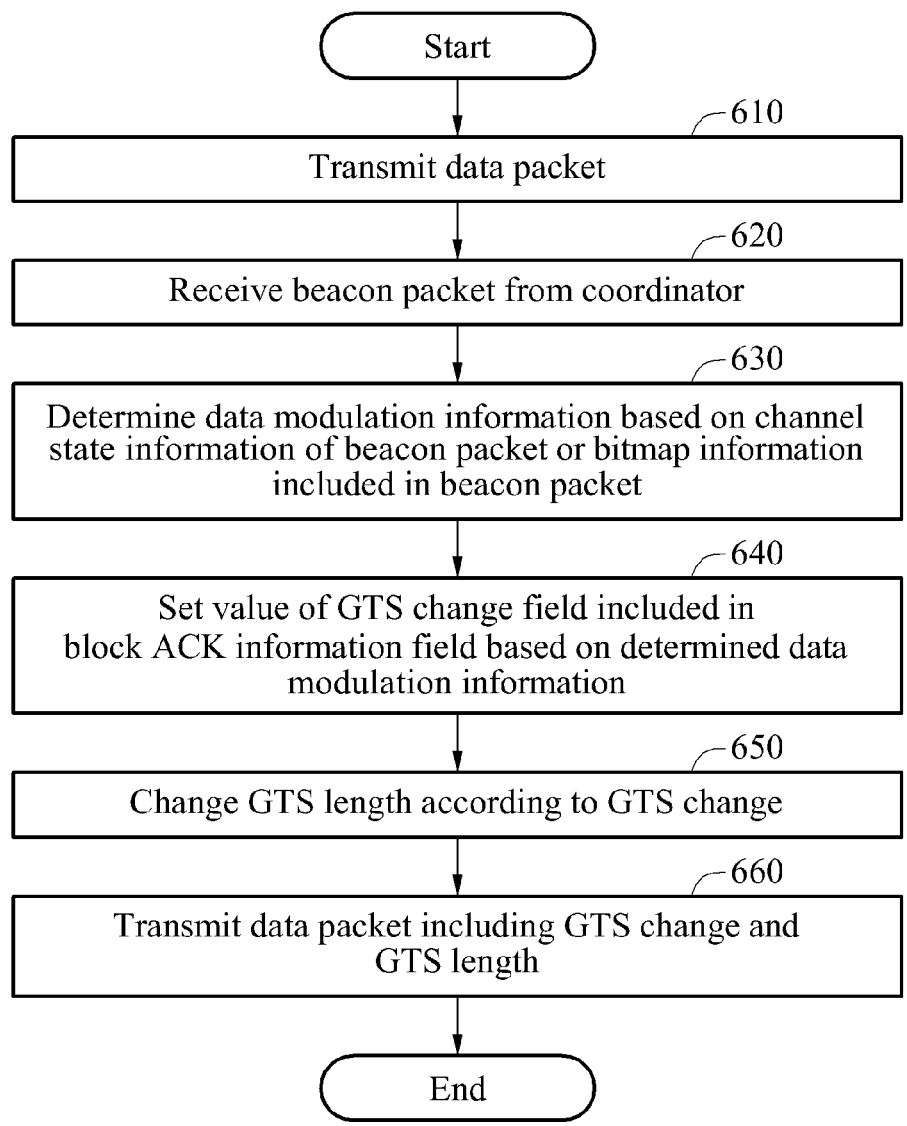
FIG. 6 is a flowchart illustrating an example of an operation method of a node in response to a node controlling a link adaptation.

FIG. 6 illustrates an example of an operation method of a node in response to a node controlling a link adaptation.

Referring to FIG. 6, the node transmits a data packet to a coordinator in operation 610, and receives a beacon packet from the coordinator in operation 620. The beacon packet includes a bitmap indicating whether the transmitted data packet is received.

In operation 630, the node determines data modulation information based on channel state information of the beacon packet received from the coordinator or bitmap information included in the beacon packet.

In operation 640, the node sets a value of a GTS change field included in a block ACK information field of the data packet based on the determined data modulation information. For example, when a GTS length is changed based on the determined data modulation information, the node sets a value of the GTS change field to "1".

When transmitting information, for example, a changed slot length, used for the coordinator to adjust the GTS length, the node records the information in a MAC payload of the data packet, for example, a slot length field of a GTS field included in a block ACK information field, and transmits the information.

In operation 650, the node changes a GTS length according to the GTS change. In an example, the node may change a GTS length to secure a QoS such as a throughput based on the determined data modulation information.

In operation 660, the node transmits, to the coordinator, the data packet including, for example, the GTS change and the changed GTS length.

The coordinator receives, from the node, the data packet including the GTS change and the changed GTS length, and adjusts GTS field values within a next superframe of the corresponding node based on whether resources are available. The coordinator records an allowance or disallowance of the adjusted GTS field values in a GTS field of the next beacon packet and broadcasts the same.

Figure 7:
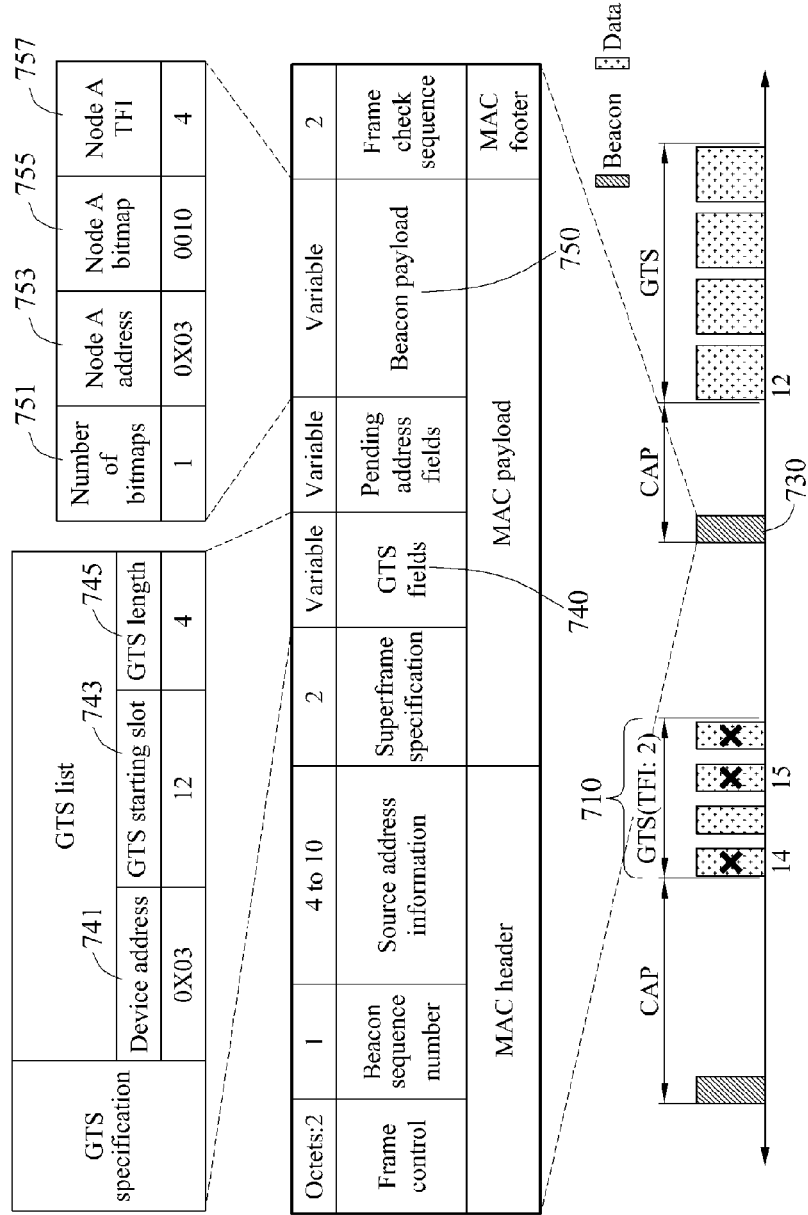
FIG. 7 is a diagram illustrating an example of a format of a beacon packet and an operation of a coordinator in response to the coordinator controlling a link adaptation.

FIG. 7 is a diagram illustrating an example of a format of a beacon packet and an operation of a coordinator in response to the coordinator controlling a link adaptation.

FIG. 7 illustrates an example in which a coordinator changes a GTS length and a data modulation method of a node using a beacon packet.

In an example, it is assumed that GTS 14 and GTS 15 are allocated to a node A in a GTS section 710, the node A has transmitted four packets using a modulation method corresponding to a TFI 2, and the coordinator has failed in receiving three packets aside from the second packet.

In a next superframe, the coordinator creates a bitmap of a data packet successfully received in the GTS section 710 and broadcasts a beacon packet 730 including the created bitmap.

In this example, the beacon packet 730 includes GTS fields 740 and a beacon payload 750. The following information may be stored in each field of the beacon payload 750.

In an example, only a single node, for example, the node A uses a block ACK and thus, "1" is recorded in a number of bitmaps field 751 of the beacon payload 750 and a short address "0X03" of the node A is recorded in a node address field 753.

A received packet is recorded as "1" and a not-received packet is recorded as "0" in a node bitmap field 755. Since only the second packet is successfully received, "0010" is recorded in the node bitmap field 755 in order in which packets are received.

Due to a poor PER of a packet, the coordinator may determine to use a further stable TFI4 modulation method.

The coordinator may set a TFI field value of a node to "4" to use the determined TFI4 modulation method.

When changing a data modulation method, the coordinator may calculate the number of GTSs additionally required to transmit the same number of packets. The coordinator calculates an amount of time used for a packet transmission by dividing a packet length using the data modulation method. The coordinator calculates a total amount of transmission time used for a total packet transmission based on the assumption that the number of packets to be transmitted in a superframe is to be maintained.

Here, an inter frame space (IFS) may be added between continuous packets. The same number of or the smallest number of GTSs compared to the calculated total amount of time may be the number of GTSs required for the changed data modulation method. For example, when the data modulation method is changed from TFI2 to TFI4, the coordinator verifies that the number of GTSs of a node is to be increased from "2" to "4".

The coordinator also calculates a GTS starting slot based on the number of GTSs to be allocated to the node and a GTS length changed based on the changed data modulation method. Here, the GTS starting slot may use a method supported in an IEEE 802.15.4 standard and may also use a method of filling slots from a rear of an active section in a superframe.

For example, when the GTS 14 and the GTS 15 were used before changing a data modulation method and four GTSs are required after changing the data modulation method, the coordinator uses a GTS 12, a GTS 13, the GTS 14, and the GTS 15 corresponding to four slots from the GTS 15 that is a rear of the active section.

The coordinator records "0X03" in a device address field 741 of a corresponding node, "12" in a GTS starting slot field 743, and records "4" corresponding to the changed number of GTSs in a GTS length field 745 of the GTS fields 740.

The node receives the beacon packet 730 from the coordinator, interprets the GTS fields 740, verifies that the allocated GTS starting slot is "12", and transmits the data packet from the GTS 12 using the data modulation method TFI4 verified from the beacon payload 750.

Figure 8A:
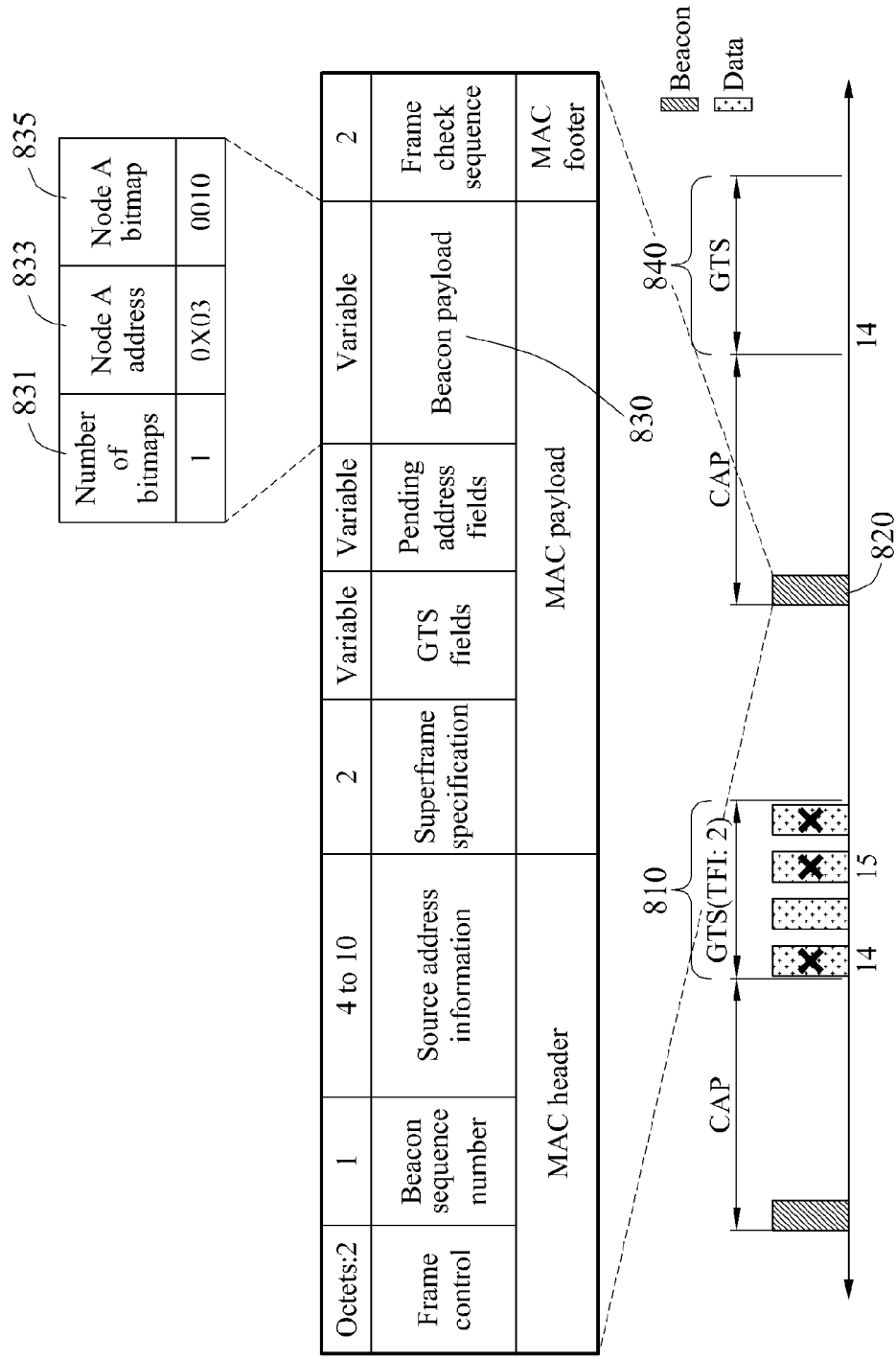
FIGS. 8A, 8B, and 8C illustrate examples of sequentially describing operations of a coordinator and a node and changing configurations of a beacon packet and a data packet in response to the node controlling a link adaptation.
Figure 8B:
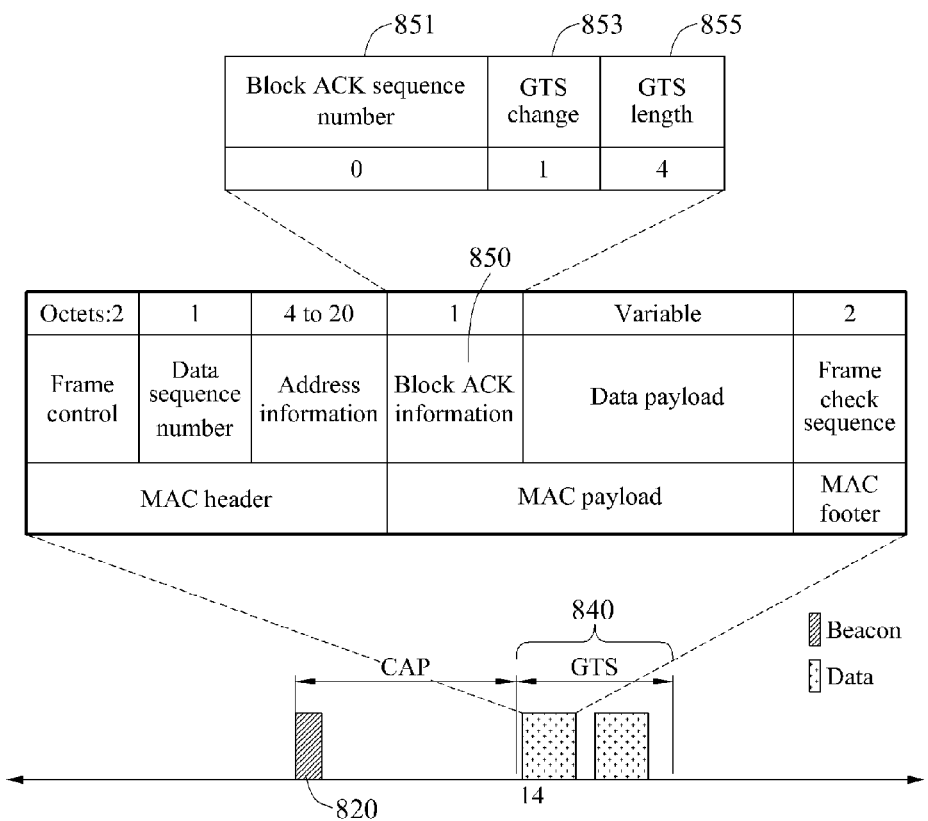
Figure 8C:
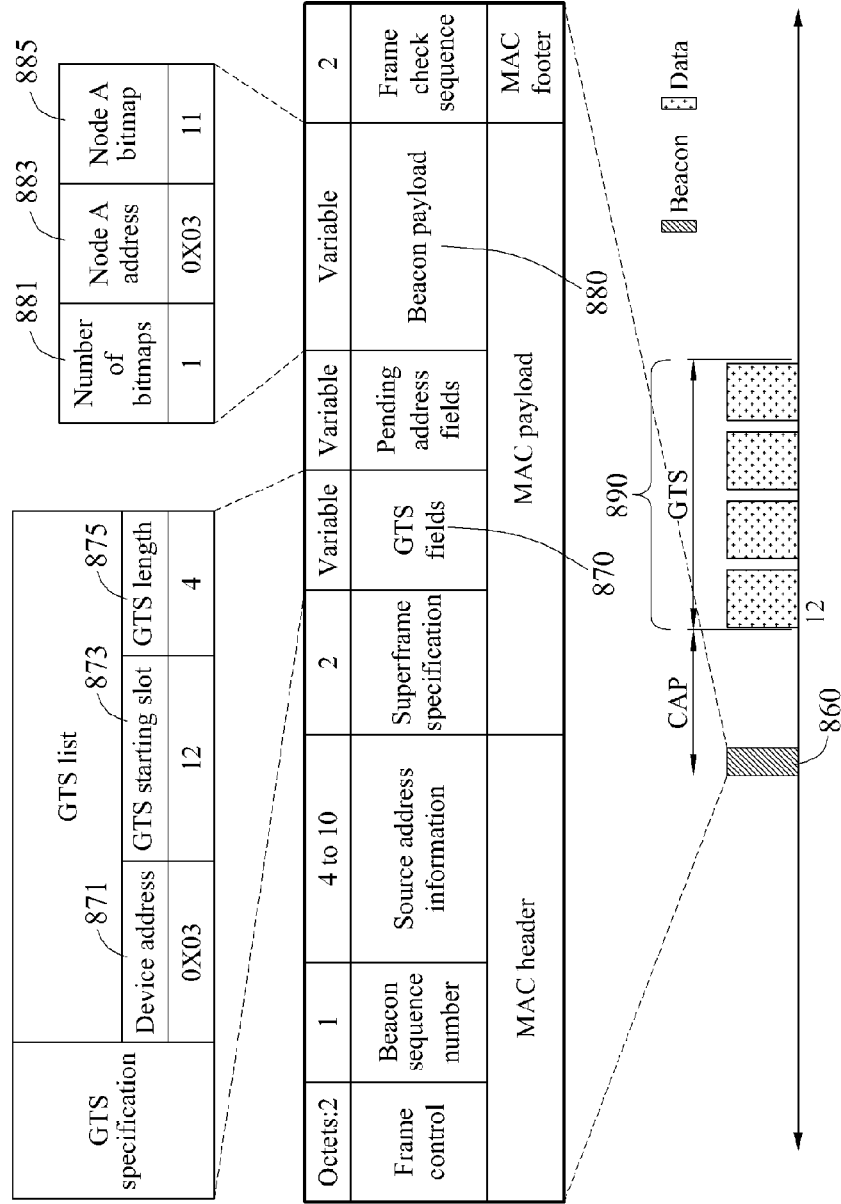

FIGS. 8A, 8B, and 8C illustrate examples of sequentially describing operations of a coordinator and a node and changing configurations of a beacon packet and a data packet in response to the node controlling a link adaptation.

FIG. 8A illustrates an example in which the coordinator transfers a bitmap result indicating whether a data packet transmitted in a previous GTS section 810 is received through a beacon packet 820.

A node A has transmitted four packets in GTS 14 and GTS 15 using a data modulation method TFI2 in the previous GTS section 810. In this example, transmissions of remaining three packets aside from a second packet were failures and bitmap information related thereto is included in a beacon payload 830 of a next superframe and transferred.

In an example, only a single node, for example, the node A uses a block ACK and thus, "1" is recorded in a number of bitmaps field 831 of the beacon payload 830 and a short address "0X03" of the node A is recorded in a node address field 833.

A received packet is recorded as "1" and a not-received packet is recorded as "0" in a node bitmap field 835. Since only the second packet is successfully received, "0010" is recorded in the node bitmap field 835 in order in which packets are received.

In this example, since the node controls a link adaptation, TFI information of the node is not included in the beacon payload 830.

FIG. 8B illustrates an example of a block ACK information field 850 of a data packet when the node receives the beacon packet 820 from the coordinator and determines a GTS change due to a need of a link adaptation.

The node verifies bitmap information from the beacon packet 820, determines to use TFI4 that is a further stable data modulation method compared to TFI2, and transmits a data packet using the data modulation method TFI4. Here, the node determines to increase the number of GTSs for a throughput and describes requirements associated with the GTS change in the block ACK information field 850 of the MAC payload of the data packet.

In more detail, the node sets a block ACK sequence number field 851 to "0", and sets a GTS change field 853 to "1" because the node has determined to increase the number of GTSs. Also, the node sets a GTS length field 855 to "4" and requests the coordinator to allocate a slot having a corresponding slot length.

In this example, the node transmits only two data packets in an allocated GTS section 840 but is not limited thereto. That is, the node may transmit more data packets.

FIG. 8C illustrates an example of a beacon packet 860 used for a node to transmit a data packet using a changed data modulation method in a GTS section 890 in response to an approval of a coordinator on requirements requested by the node in FIG. 8B.

When the coordinator successfully receives all of two data packets from the node A in a previous superframe, the coordinator sets a number of bitmaps field 881 to "1", sets a node address field 883 to "0X03", and sets a node bitmap field 885 to "11" in a beacon payload 880.

When the coordinator verifies the requirements, for example, a GTS change and a changed GTS length, associated with the GTS change verified from the data packet received in the previous superframe, the coordinator verifies that resources are available and determines to allow the GTS change.

When the coordinator determines to allow the GTS change, the coordinator sets information about the GTS change to GTS fields 870 of the beacon packet 860.

The coordinator calculates the number of GTSs to be additionally allocated to the node, a changed GTS length, and a GTS starting slot based on information verified through the data packet received in the previous superframe, and sets each value of the GTS fields 870 based thereon, but is not limited thereto. That is, the coordinator may calculate more or less features than those described above.

The coordinator sets a device address field 871 of the GTS field 870 to "0X03" corresponding to a short address of the node A, sets a GTS starting slot 873 to "12", and sets a GTS length field 875 to "4".

The node receives the beacon packet 860, and transmits a data packet in a slot 12 that is a new GTS starting slot, based on information included in the GTS fields 870 of the beacon packet 860.

Figure 9:
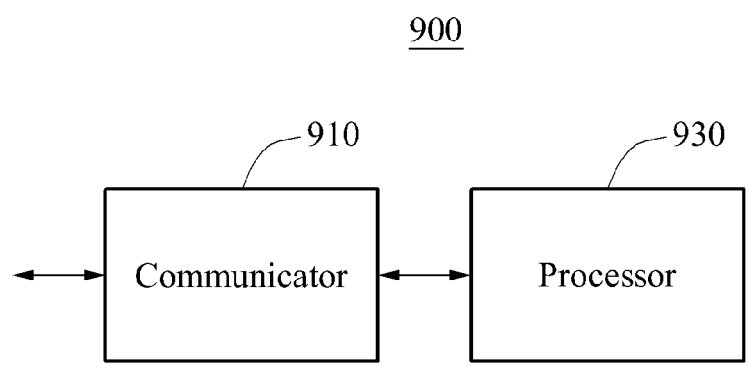
FIG. 9 is a block diagram illustrating an example of a coordinator.

FIG. 9 is a block diagram illustrating an example of a coordinator.

Referring to FIG. 9, a coordinator 900 includes a communicator 910 and a processor 930. Although FIG. 9 illustrates the communicator 910 and the processor 930 included in the coordinator 900, the communicator 910 and the processor 930 may be embodied as independent hardware.

The communicator 910 receives a data packet from at least one node.

The processor 930 configures bitmap information indicating whether the data packet is received. The processor 930 configures, for each node, bitmap information indicating whether the data packet is received in a GTS section.

The processor 930 includes the bitmap information configured for each node, in a beacon payload of a beacon packet.

The communicator 910 broadcasts the beacon packet configured by the processor 930.

The processor 930 determines data modulation information including a modulation rate of the data packet based on channel state information of the data packet.

The processor 930 sets a TFI value of a node included in the beacon payload of the beacon packet or calculates the number of GTSs to be allocated to the node, based on the determined data modulation information. Also, the processor 930 adjusts a GTS length FIG. 10 illustrates an example of a node.

Figure 10:
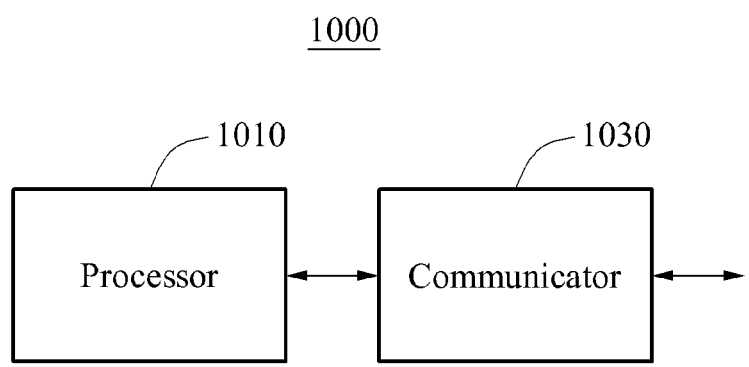
FIG. 10 is a block diagram illustrating an example of a node.

Referring to FIG. 10, a node 1000 includes a processor 1010 and a communicator 1030. Although FIG. 10 illustrates the processor 1010 and the communicator 1030 included in the node 1000, the processor 1010 and the communicator 1030 may be embodied as independent hardware.

The processor 1010 configures a MAC payload including a block ACK information field including a block ACK and data modulation information.

The processor 1010 determines data modulation information based on channel state information of a beacon packet received from a coordinator or bitmap information included in the beacon packet. Also, the processor 1010 sets a value of a GTS change field included in the block ACK information field of the data packet based on the determined data modulation information or changes a GTS length according to the GTS change.

The communicator 1030 transmits the data packet including the MAC payload to the coordinator.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operation method of a coordinator, the method comprising:
 receiving a data packet from a node;
 configuring bitmap information indicating whether the data packet is received;

determining data modulation information from the data packet;

determining, based on the data modulation information, a determination result indicating whether to adjust either one or both of a transmission format indication (TFI) value of a guaranteed time slot (GTS) length of the node; and broadcasting a beacon packet comprising the bitmap information and the determination result.

2. The method of claim 1, wherein the configuring of the bitmap information comprises configuring, for the node, the bitmap information indicating whether the data packet is received in a GTS section.

3. The method of claim 2, wherein the broadcasting of the beacon packet comprises broadcasting the beacon packet by including the bitmap information configured for the node in a beacon payload of the beacon packet.

4. The method of claim 3, wherein the beacon payload of the beacon packet comprises at least one of a number of bitmap information, an address of the node, a bitmap of the node, and a TFI of the node.

5. The method of claim 4, wherein the TFI of the node is used for the coordinator to control a link adaptation.

6. The method of claim 1,
wherein the data modulation information comprises a modulation method and a modulation rate of the data packet.

7. The method of claim 6, wherein the determining of the data modulation information comprises determining the data modulation information based on channel state information of the data packet.

8. The method of claim 6, further comprising:
setting the TFI value of the node comprised in a beacon payload of the beacon packet based on the determined data modulation information.

9. The method of claim 6, further comprising:
calculating a number of guaranteed time slots (GTSs) allocated to the node based on the determined data modulation information.

10. The method of claim 6, further comprising:
changing the GTS length based on the determined data modulation information.

11. The method of claim 10, wherein the broadcasting of the beacon packet comprises broadcasting, to the node, the beacon packet comprising a GTS field including the changed GTS length and a GTS starting slot.

12. The method of claim 1, further comprising:
receiving the data packet comprising a block acknowledgement (ACK) information field comprising a guaranteed time slot (GTS) change determined by the node and a changed GTS length.

13. The method of claim 12, further comprising:
adjusting values of a GTS field based on information of the block ACK information field comprised in the data packet; and broadcasting the adjusted values of the GTS field through a next beacon packet.

14. An operation method of a node, the method comprising:

determining data modulation information based on channel state information of a beacon packet received from a coordinator or bitmap information comprised in the beacon packet;

determining, based on the data modulation information or on the bitmap information, a determination result indicating whether to change a guaranteed time slot (GTS) length of the node;

configuring a media access control (MAC) payload comprising a block acknowledgement (ACK) information field, the ACK information field comprising a block ACK, the data modulation information, and the determination result; and transmitting a data packet comprising the MAC payload to the coordinator.

15. The method of claim 14, wherein the block ACK information field further comprises at least one of a block ACK sequence number, a GTS change in association with a data modulation, and the GTS length.

16. The method of claim 14, further comprising:
setting a GTS change comprised in the block ACK information field of the data packet based on the determination result.

17. The method of claim 16, further comprising:
changing a GTS length according to the GTS change.

18. The method of claim 17, further comprising:
transmitting, to the coordinator, the data packet comprising the GTS change and the changed GTS length.

19. A non-transitory computer-readable storage medium comprising a program comprising instructions to cause a computer to perform the method of claim 1.

* * * * *